Patented Apr. 10, 1923.

1,450,975

UNITED STATES PATENT OFFICE.

ANDREW KELLY, OF LONDON, ENGLAND, ASSIGNOR TO BORAX CONSOLIDATED LIMITED, OF LONDON, ENGLAND.

PROCESS FOR THE MANUFACTURE OF BORAX AND BORIC ACID.

No Drawing. Application filed April 12, 1921. Serial No. 460,806.

*To all whom it may concern:*

Be it known that I, ANDREW KELLY, subject of the King of Great Britain, residing at 57 Chancery Lane, London W. C. 2, England, chemist, have invented certain new and useful Improvements in Processes for the Manufacture of Borax and Boric Acid, of which the following is a specification.

This invention relates to the manufacture of borax and boric acid.

According to the invention sodium pentaborate together with a sodium salt is treated with ammonia to produce borax, and the ammonia is regenerated from the resulting mother liquors.

The preferred method for regenerating the ammonia results in boric acid being obtained as a by-product.

Thus, firstly, the mother liquors may be distilled, without the addition of any other substance, in which case ammonia is evolved and boric acid liberated.

Or, secondly, where the desired quantity of boric acid is relatively small, lime may be used to recover the balance of the ammonia.

One convenient method of carrying out the process the subject of the invention is as follows.

Sodium pentaborate is dissolved in water, and is then filtered.

Sodium chloride is added in sufficient quantity to provide the necessary alkali required to convert the whole of the sodium pentaborate into borax on the addition of the determined quantity of ammonia.

The borax is crystallized out from this solution, the crystals being drained and washed until the washings are free from chloride.

The mother liquors contain the whole of the ammonia used (in the form of chloride of ammonium) and an amount of borax depending upon the concentration of the solutions used and the quantity of water required for eliminating the ammonium chloride from the borax crystals.

Under certain conditions the proportion of borax present in the mother liquors may be sufficient to liberate on distillation the whole of the ammonia which was originally added and simultaneously to set free the boric acid combined in the mother liquors as borax. The ammonia so liberated is utilized for decomposing a further quantity of pentaborate, and the boric acid is purified and crystallized by the recognized methods.

The equation representing the first reaction under these conditions would be as follows:—

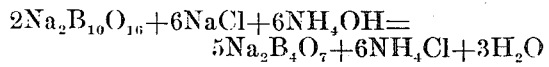

and the equation representing the second reaction i. e. on heating, would be represented as follows:—

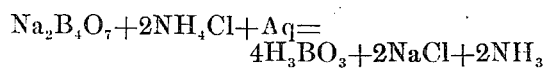

Under other conditions the borax present in the mother liquors may be insufficient to liberate the whole of the ammonia, and in these circumstances, the mother liquors are distilled until ammonia ceases to be evolved. The boric acid that has been set free is then crystallized out, and the residual liquors are treated with sufficient lime to liberate the balance of the ammonia; the small amount of boric acid which would be present in the residual liquors, as calcium borate may then be recovered by the known methods.

By the above described invention an efficient and economical combined process for the manufacture of borax and boric acid is obtained.

What I claim is:—

1. A process for the manufacture of borax characterized by treating sodium pentaborate by adding thereto a sodium salt and ammonia.

2. A process for the manufacture of borax characterized by the fact that sodium pentaborate is treated by adding a sodium salt and ammonia, boric acid being recovered in the course of the reaction.

3. A process for the manufacture of borax characterized by adding to sodium pentaborate a determined quantity of ammonia and a quantity of sodium salt capable of converting the whole of said sodium pentaborate into borax.

4. A process for the manufacture of borax characterized by adding to sodium pentaborate a determined quantity of ammonia and a quantity of a sodium salt capable of converting the whole of said sodium pentaborate into borax, crystallizing out the borax and recovering boric acid from the mother liquors thereafter.

In testimony whereof I have hereunto set my hand in presence of two subscribing witnesses.

ANDREW KELLY.

Witnesses:
ERNEST J. HILL,
T. J. OSMAN.